(12) United States Patent
Kang

(10) Patent No.: US 10,705,647 B2
(45) Date of Patent: Jul. 7, 2020

(54) TOUCH DISPLAY DEVICE CAPABLE OF SELECTIVELY CHANGING CHARACTERISTIC OF TOUCH DRIVING SIGNAL

(71) Applicant: LG Display Co., Ltd., Seoul (KR)

(72) Inventor: YeonWook Kang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/853,585

(22) Filed: Dec. 22, 2017

(65) Prior Publication Data

US 2018/0188882 A1 Jul. 5, 2018

(30) Foreign Application Priority Data

Dec. 30, 2016 (KR) .................... 10-2016-0184472
Dec. 8, 2017 (KR) .................... 10-2017-0168398

(51) Int. Cl.
*G06F 3/045* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0418* (2013.01)

(58) Field of Classification Search
CPC ....... G06F 3/044; G06F 3/0416; G06F 3/0418
USPC ........................................................ 345/173
See application file for complete search history.

(56) References Cited

U.S. PATENT DOCUMENTS

2004/0003949 A1* 1/2004 Lin .................... G06F 3/044
178/18.01
2011/0050585 A1* 3/2011 Hotelling ............ G06F 3/0412
345/173
2011/0193820 A1* 8/2011 Chen .................. G06F 3/0412
345/174
2011/0216039 A1* 9/2011 Chen .................. G06F 3/0412
345/174
2012/0098790 A1* 4/2012 Han .................... G06F 3/044
345/174

(Continued)

FOREIGN PATENT DOCUMENTS

KR 10-2014-0066818 A 6/2014
KR 10-1634642 6/2016

OTHER PUBLICATIONS

Korean Intellectual Property Office, Office Action, KR Patent Application No. 10-2017-0168398, dated Feb. 28, 2019, six pages (with concise explanation of relevance).

*Primary Examiner* — Adam J Snyder
(74) *Attorney, Agent, or Firm* — Fenwick & West LLP

(57) ABSTRACT

Embodiments of the present application provide a touch control circuit, a touch driving circuit, and a touch display device, which selectively change and set one or more of a waveform, an amplitude voltage, and a pulse period of a touch driving signal without reduction in touch performance, and thus, provide a touch display device and an application device which are stable and reliable. Also, embodiments of the present application provide a touch control circuit, a touch driving circuit, and a touch display device, which selectively change and set one or more of a waveform, an amplitude voltage, and a pulse period of a load free signal without reduction in touch performance, and thus, provide a touch display device and an application device which are stable and reliable.

18 Claims, 9 Drawing Sheets

(56) References Cited

U.S. PATENT DOCUMENTS

| | | | | |
|---|---|---|---|---|
| 2013/0113735 A1* | 5/2013 | Takeuchi | ............. | G06F 3/0412 345/173 |
| 2014/0049509 A1* | 2/2014 | Shepelev | ................ | G06F 3/044 345/174 |
| 2014/0062937 A1* | 3/2014 | Schwartz | ................ | G06F 3/044 345/174 |
| 2014/0139480 A1* | 5/2014 | Seo | ......................... | G06F 3/044 345/174 |
| 2014/0253498 A1* | 9/2014 | Suzuki | .................... | G06F 3/044 345/174 |
| 2014/0292683 A1* | 10/2014 | Azumi | ................. | G06F 3/0412 345/173 |
| 2015/0177880 A1* | 6/2015 | Shin | ..................... | G06F 3/0412 345/174 |
| 2015/0220208 A1* | 8/2015 | Noguchi | ................. | G06F 3/044 345/174 |
| 2017/0351380 A1* | 12/2017 | Ahn | ........................ | G06F 3/044 |

* cited by examiner

FIG. 5A

| T1 | T2 | T3 | T4 |
|---|---|---|---|
| Enable / Disable : 0/1 | 1st bit : 0/1 | 2nd bit : 0/1 | 3rd bit : 0/1 |

FIG. 5B

| T2 | T3 | T4 | Waveform |
|---|---|---|---|
| 0 | 0 | 0 | TWR 0% |
| 0 | 0 | 1 | TWR 25% |
| 0 | 1 | 0 | TWR 50% |
| 0 | 1 | 1 | TWR 75% |
| 1 | 0 | 0 | TWR 100% |
| 1 | 0 | 1 | Sine Wave |
| 1 | 1 | 0 | Adjustable |
| 1 | 1 | 1 | Random |

TOUCH DISPLAY DEVICE CAPABLE OF SELECTIVELY CHANGING CHARACTERISTIC OF TOUCH DRIVING SIGNAL

CROSS-REFERENCE TO RELATED APPLICATIONS

This application claims the priority benefit of Republic of Korea Patent Application No. 10-2016-0184472 filed on Dec. 30, 2016, and Republic of Korea Patent Application No. 10-2017-0168398 filed on Dec. 8, 2017, each of which is hereby incorporated by reference in its entirety.

BACKGROUND

Field of the Technology

The present application relates to a touch control circuit, a touch driving circuit, and a touch display device.

Discussion of the Related Art

With the advancement of information-oriented society, various requirements for display devices for displaying an image are increasing. Recently, various display devices such as liquid crystal display (LCD) devices, plasma display panels (PDPs), organic light emitting display devices, and quantum dot display devices are being practically used.

As a type of display device, touch display devices provide a touch-based input method which enables a user to easily, intuitively, and conveniently input information or a command, instead of general input methods such as buttons, keyboards, and mouse devices.

The touch display devices should determine the occurrence or not of a user touch and accurately detect touch coordinates (a touch position), for providing the touch-based input method.

To this end, touch panels (touch screen panels) mainly use a capacitance touch method which detects the occurrence or not of a touch and touch coordinates, based on a capacitance variation between touch electrodes provided as touch sensors or a capacitance variation between pointers such as a touch electrode and a finger.

Such a capacitance touch type touch device should sense a plurality of touch electrodes, for determining the occurrence or not of a touch. To this end, a touch driving signal should be applied to a plurality of touch electrodes.

In order to provide a user with a display, the capacitance touch type touch devices may be used as various types at various places. For example, the capacitance touch type touch device may be used as various types such as outdoor displays installed at an outdoor place as well as an indoor place, in-vehicle display devices, display devices for smartphones which are much used recently, notebook computers, monitors, televisions (TVs), etc. Also, the capacitance touch type touch devices may be used in zones, which are high in annual mean temperature, or zones which are low in annual mean temperature. Also, touch type display devices may be used even in zones which are rainy or are very high in humidity.

Due to an environment where touch devices are used, touch performance can be reduced, or in the worst case, a touch cannot be recognized. Also, due to an ambient environment, the touch devices can provide a cause of electromagnetic interference (EMI). Also, due to a specific environment, much noise can occur in the touch devices, and for this reason, a touch recognition rate can be greatly reduced.

Due to such problems, the system stability of the touch devices can be reduced, and an adverse effect can be applied to other ambient electrode devices and the like, causing various problems.

SUMMARY

Accordingly, the present application is directed to provide a touch control circuit, a touch driving circuit, and a touch display device that substantially obviate one or more problems due to limitations and disadvantages of the related art.

An aspect of the present application is directed to provide a touch control circuit, a touch driving circuit, and a touch display device, in which touch driving is performed without any reduction in touch performance.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

According to embodiments of the present application, provided may be a touch control circuit, a touch driving circuit, and a touch display device, which remove or minimize an effect of EMI without reduction in touch performance.

According to embodiments of the present application, provided may be a touch control circuit, a touch driving circuit, and a touch display device, which are to selectively change a waveform of a touch driving signal without reduction in touch performance.

According to embodiments of the present application, provided may be a touch control circuit, a touch driving circuit, and a touch display device, which are set to selectively change an amplitude voltage of a touch driving signal without reduction in touch performance.

According to embodiments of the present application, provided may be a touch control circuit, a touch driving circuit, and a touch display device, which are set to selectively change a pulse period of a touch driving signal without reduction in touch performance.

According to embodiments of the present application, provided may be a touch control circuit, a touch driving circuit, and a touch display device, which are set to selectively change one or more of a waveform, an amplitude voltage, and a pulse period of a touch driving signal without reduction in touch performance.

According to embodiments of the present application, provided may be a touch control circuit, a touch driving circuit, and a touch display device, which improve touch performance in a touch driving period of the touch display device and prevent occurrence of an undesired parasitic capacitance.

According to embodiments of the present application, provided may be a touch control circuit, a touch driving circuit, and a touch display device, which are set to selectively change a waveform of a load free signal for preventing occurrence of a parasitic capacitance, without reduction in touch performance.

According to embodiments of the present application, provided may be a touch control circuit, a touch driving circuit, and a touch display device, which are set to selectively control a load free signal for preventing occurrence of a parasitic capacitance, without reduction in touch performance.

According to embodiments of the present application, provided may be a touch control circuit, a touch driving circuit, and a touch display device, which improve touch performance in a touch driving period of the touch display device and minimize power consumption.

According to embodiments of the present application, provided may be a touch control circuit, a touch driving circuit, and a touch display device, which improve touch performance in a touch driving period of the touch display device and minimize an influence of internal or external noise.

According to embodiments of the present application, provided may be a touch control circuit, a touch driving circuit, and a touch display device, which improve touch performance and minimize inrush current in a touch driving period of the touch display device.

According to embodiments of the present application, provided may be a touch control circuit, a touch driving circuit, and a touch display device, which improve touch performance in a touch driving period of the touch display device and are set to selectively change a waveform, an amplitude voltage, or a pulse period of an appropriate touch driving signal, based on an internal or external environment of the touch display device.

According to embodiments of the present application, provided may be a touch control circuit, a touch driving circuit, and a touch display device, which improve touch performance in a touch driving period of the touch display device and are set to selectively and automatically change a waveform, an amplitude voltage, or a pulse period of an appropriate touch driving signal, based on a predetermined time or a predetermined condition.

According to embodiments of the present application, provided may be a touch control circuit, a touch driving circuit, and a touch display device, which include a touch core outputting a touch driving signal for driving a touch electrode of a display panel in a touch driving period, and determining occurrence or not of a touch or detecting a touch position, based on a touch sensing signal generated according to the touch driving signal, wherein the touch driving signal has a first characteristic corresponding to a waveform, a second characteristic corresponding to an amplitude voltage which is a difference between a first voltage level and a second voltage level, and a third characteristic corresponding to one period of a pulse, and the touch control circuit is set to selectively change one or more of the first to third characteristics.

According to embodiments of the present application, provided may be a touch control circuit, a touch driving circuit, and a touch display device, which further include a lookup table predefined to selectively change one or more of the first to third characteristics.

According to embodiments of the present application, provided may be a touch control circuit, a touch driving circuit, and a touch display device, which are set to select the first characteristic from among a sine wave and a non-sinusoidal wave.

According to embodiments of the present application, provided may be a touch control circuit, a touch driving circuit, and a touch display device, in which when the first characteristic of the touch driving signal is the non-sinusoidal wave, a pulse of the touch driving signal is set to include a second unit period where a voltage is shifted from the first voltage level to the second voltage level, a third unit period where the voltage is maintained at the second voltage level, a fourth unit period where the voltage is shifted from the second voltage level to the first voltage level, and a fifth unit period where the voltage is maintained at the first voltage level.

According to embodiments of the present application, provided may be a touch control circuit, a touch driving circuit, and a touch display device, which are set to output the touch driving signal where a time of the third unit period of the pulse of the touch driving signal is 1% to 99% of a sum of a time of the second unit period and a time of the third unit period.

According to embodiments of the present application, provided may be a touch control circuit, a touch driving circuit, and a touch display device, in which a time of the second unit period is the same as a time of the fourth unit period.

According to embodiments of the present application, provided may be a touch control circuit, a touch driving circuit, and a touch display device, in which a velocity at which the touch driving signal is shifted from the first voltage level to the second voltage level in the second unit period differs from a velocity at which the touch driving signal is shifted from the second voltage level to the first voltage level in the fourth unit period.

According to embodiments of the present application, provided may be a touch control circuit, a touch driving circuit, and a touch display device, in which the touch control circuit is set to output the touch driving signal where a time of the third unit period of the pulse of the touch driving signal is 0% to 100% of a sum of a time of the second unit period and a time of the third unit period.

According to embodiments of the present application, provided may be a touch control circuit, a touch driving circuit, and a touch display device, which are set to automatically change one or more of the first characteristic, the second characteristic, and the third characteristic of the touch driving signal, based on a predetermined time or a predetermined condition.

According to embodiments of the present application, provided may be a touch control circuit, a touch driving circuit, and a touch display device, which are set to apply a load free signal, having the same phase as a phase of the touch driving signal, to one or more lines or electrodes of another touch electrode, a data line, and a gate line of the display panel in the touch driving period.

According to embodiments of the present application, provided may be a touch control circuit, a touch driving circuit, and a touch display device, which are set so that one or more of a load free signal applied to the other electrode of the display panel, a load free signal applied to the data line, and a load free signal applied to the gate line are output as signals having different first characteristics.

According to embodiments of the present application, provided may be a touch control circuit, a touch driving circuit, and a touch display device, which are set so that one or more of a load free signal applied to the other electrode of the display panel, a load free signal applied to the data line, and a load free signal applied to the gate line are not output.

According to embodiments of the present application, provided may be a touch control circuit, a touch driving circuit, and a touch display device, which are so that an electrode or a line, to which a load free signal is not applied, of the other electrode, the data line, and the gate line of the display panel is electrically floated.

According to embodiments of the present application, provided may be a touch control circuit, a touch driving circuit, and a touch display device, which further include one or more of a data driving circuit, a gate driving circuit, and a touch driving circuit.

According to embodiments of the present application, provided may be a touch display device which includes a display panel including a plurality of data lines, a plurality of gate lines, and a plurality of touch electrodes, a data driving circuit applying data voltages to the plurality of data lines, a gate driving circuit applying a gate driving signal to the plurality of gate lines, and a touch driving circuit applying a touch driving signal to the plurality of touch electrodes, wherein the touch driving signal has a first characteristic corresponding to a waveform, a second characteristic corresponding to an amplitude voltage which is a difference between a first voltage level and a second voltage level, and a third characteristic corresponding to one period of a pulse, and the touch display device is set to selectively change one or more of the first to third characteristics.

According to embodiments of the present application, provided may be a touch control circuit and a touch display device, in which the touch display device is divisionally driven in a display driving period and a touch driving period according to a touch control signal, and the touch control signal is set to have a voltage level which is shifted once or twice or more during one frame period.

According to embodiments of the present application, provided may be a touch display device which includes a display panel including a plurality of data lines, a plurality of gate lines, and a plurality of touch electrodes and a touch driving circuit applying a touch driving signal to the plurality of touch electrodes, wherein the touch driving signal includes a second unit period where a voltage is linearly or nonlinearly shifted, a third unit period where the voltage is maintained at a certain level, a fourth unit period where the voltage is linearly or nonlinearly shifted, and a fifth unit period where the voltage is maintained at a certain level, and a voltage variation of the second unit period and a voltage variation of the fourth unit period of the touch driving signal has a symmetrical relationship or an asymmetrical relationship with respect to the third unit period, and the touch driving signal is a pulse signal which is repeated at the second to fifth unit periods.

According to embodiments of the present application, provided may be a touch display device in which a voltage of the second unit period and a voltage of the fourth unit period of the touch driving signal are shifted identically or similarly to at least a portion of a graph of a function which includes an exponential function, a logarithmic function, a sine function, a cosine function, a step function, or a combination of two or more of the exponential function, the logarithmic function, the sine function, the cosine function and the step function.

According to embodiments of the present application, provided may be a touch display device in which the touch driving circuit includes a first option pin for setting a kind of a waveform of the touch driving signal and a second option pin for setting flatness of the touch driving signal.

According to embodiments of the present application, provided may be a touch display device in which the touch driving circuit outputs the touch driving signal corresponding to a non-sinusoidal wave or a sine wave, based on a setting value of the first option pin.

According to embodiments of the present application, provided may be a touch driving circuit for applying a touch driving signal to a plurality of touch electrodes provided in a display panel, wherein the touch driving signal includes a second unit period where a voltage is linearly or nonlinearly shifted, a third unit period where the voltage is maintained at a certain level, a fourth unit period where the voltage is linearly or nonlinearly shifted, and a fifth unit period where the voltage is maintained at a certain level, a voltage variation of the second unit period and a voltage variation of the fourth unit period of the touch driving signal has a symmetrical relationship or an asymmetrical relationship with respect to the third unit period, and the touch driving signal is a pulse signal which is repeated at the second to fifth unit periods, and a waveform of the touch driving signal is set based on a value which is set in a first option pin of the touch driving circuit.

It is to be understood that both the foregoing general description and the following detailed description of the present application are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIGS. 5A and 5B are diagrams showing a data sheet and a table of a touch control circuit or a touch driving circuit where a waveform of a touch driving signal of a touch display device according to embodiments of the present application is selectively set;

DETAILED DESCRIPTION OF THE DISCLOSURE

Figure 1:
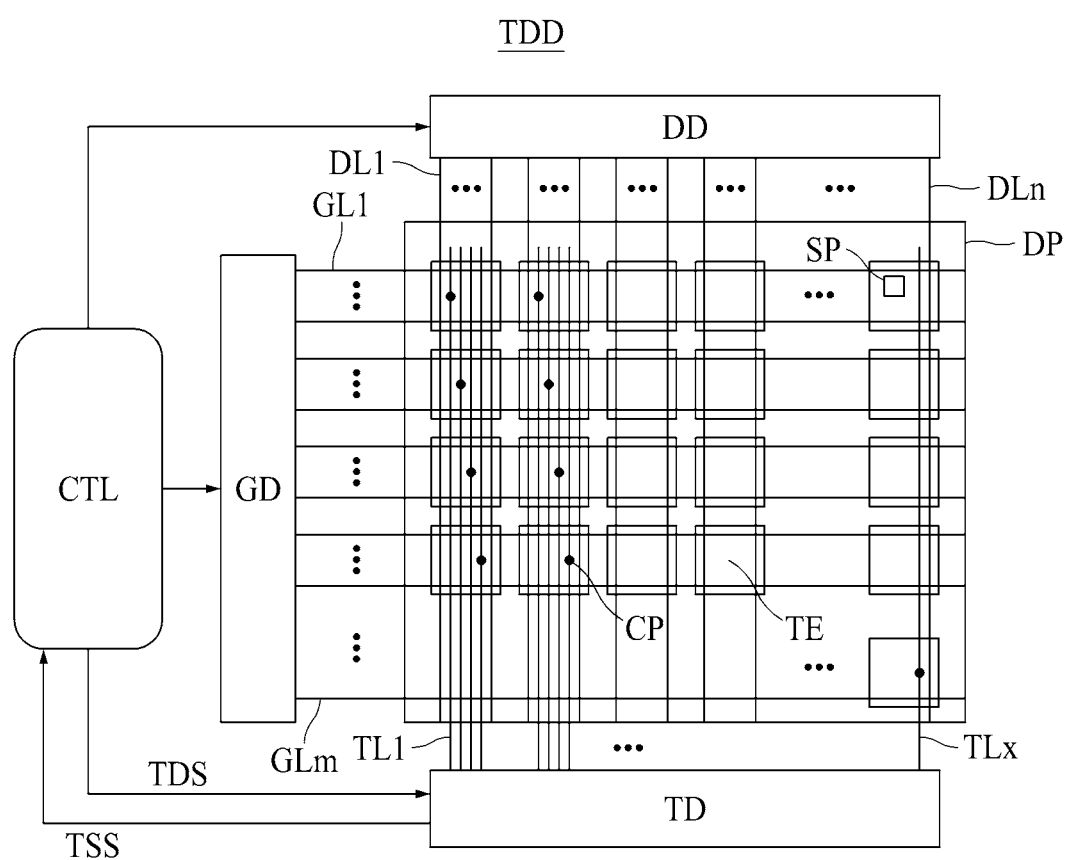
FIG. 1 is a schematic diagram of a touch display device according to embodiments of the present application.

Reference will now be made in detail to the exemplary embodiments of the present application, examples of which are illustrated in the accompanying drawings. Wherever possible, the same reference numbers will be used throughout the drawings to refer to the same or like parts.

Hereinafter, exemplary embodiments of the present application will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present application, the detailed description will be omitted.

In describing the elements of the present application, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

A touch display device (TDD) according to embodiments of the present application may be implemented as various types of display devices. For example, various types of display devices such as LCD devices, organic light emitting display devices, electroluminescence display devices, PDPs, and quantum dot display devices may be implemented with a touch control circuit and a touch sensor according to embodiments of the present application. In description below, detailed examples applied to LCD devices will be described.

Moreover, embodiments of the present application may be implemented in various types of touch types display devices. For example, embodiments of the present application may be implemented even in a resistive touch display device and a capacitive touch display device which senses a variation of a capacitance. That is, all types may be applied to a touch display device which determines the occurrence or not of a touch and detects a touch position by using a touch driving signal. In description below, detailed examples applied to a capacitive touch display device will be described.

FIG. 1 is a schematic diagram of a touch display device TDD according to embodiments of the present application. The touch display device TDD according to embodiments of the present application may include a display panel DP, a data driving circuit DD, a gate driving circuit GD, a touch driving circuit TD, and a touch control circuit CTL.

The display panel DP according to embodiments of the present application may include a plurality of data lines DL, a plurality of gate lines GL, a plurality of touch lines TL, a plurality of touch electrodes TE, and a plurality of subpixels SP.

Moreover, a plurality of touch electrodes TE included in the display panel DP may be embedded into the display panel DP, or may be configured as a separate touch layer which is disposed outside the display panel DP and is coupled to the display panel DP. However, in embodiments of the present application, only an example where the touch electrodes TE are embedded into the display panel DP will be described.

The touch display device TDD according to embodiments of the present application may include the plurality of touch electrodes TE embedded into the display panel DP. In this case, a common electrode may be provided in the display panel DP, for displaying a display image and may be used as a touch electrode TE for touch sensing. In a case where the common electrode is used as an electrode for display driving and an electrode for touch sensing, a time-divisional driving method which temporally divides and drives a display driving period and a touch driving period may be implemented. However, without temporally dividing the display driving period and the touch driving period, a divisional driving method where each of the display driving period and the touch driving period is separately driven to be controllable may be implemented. Hereinafter, only time-divisional driving of the touch display device TDD according to embodiments of the present application will be described.

Referring to FIG. 1, the touch control circuit CTL may transfer a touch driving signal TDS, which is necessary for sensing the plurality of touch electrodes TE, to the touch driving circuit TD. Also, the touch control circuit CTL may transfer a synchronization signal for controlling the touch driving circuit TD, and the touch driving circuit TD may perform touch driving according to the synchronization signal.

The touch driving circuit TD according to embodiments of the present application may sense, through touch lines TL1 to TLx, one or more of the plurality of touch electrodes TE embedded into the display panel DP according to the synchronization signal, or may group the plurality of touch electrodes TE into a plurality of touch electrode groups and may sense the touch electrode groups through the touch lines TL1 to TLx. In a case where the touch driving circuit TD senses the plurality of touch electrodes TE or the plurality of touch electrode groups, the touch driving circuit TD may transfer a touch sensing signal TSS to the touch control circuit CTL so as to detect a capacitance variation of a touch electrode TE to determine the occurrence or nor of a touch or detect a touch position.

The data driving circuit DD according to embodiments of the present application may apply data voltages to a plurality of data lines DL, for applying the data voltages for image display to the plurality of subpixels SP of the display panel DP. Also, the data driving circuit DD may receive a control signal and image signals from the touch control circuit CTL, convert the image signals into data voltages, and apply the data voltages to the plurality of subpixels SP of the display panel DP. However, the data driving circuit DD may receive the control signal and the image signals from another control circuit (for example, a timing controller) instead of the touch control circuit CTL. In this case, the data driving circuit DD may receive the image signals, transferred from the touch control circuit CTL or the other control circuit, as digital values and may convert the received image signals into analog data voltages to apply the analog data voltages to a corresponding the plurality of subpixels SP through the plurality of data lines DL.

The gate driving circuit GD according to embodiments of the present application may apply a gate driving signal, which controls a switching element provided in each of the subpixels, the switching element through a corresponding gate line of a plurality of gate lines GL so as to display an image on the plurality of subpixels SP of the display panel DP. In this case, the gate driving signal may be a gate high voltage VGH, which is a voltage for turning on the switching element, or a gate low voltage VGL which is a voltage for turning off the switching element. The gate high voltage VGH and the gate low voltage VGL may be transferred from the touch control circuit CTL, or may be transferred from another control circuit.

As another example, in the touch display device TDD according to embodiments of the present application, the touch control circuit CTL, the touch driving circuit TD, the data driving circuit DD, and the gate driving circuit GD may be implemented as one integrated chip. As another example, the touch control circuit CTL, the touch driving circuit TD, and the data driving circuit DD may be implemented as one integrated chip. That is, the touch control circuit CTL, the touch driving circuit TD, the data driving circuit DD, and the gate driving circuit GD may be implemented as one chip which is integrated based on a resolution, a size, and a specification of the display panel DP.

The display panel DP according to embodiments of the present application may include the plurality of touch electrodes TE and a plurality of touch lines TL. In this case, each of the plurality of touch lines TL may be electrically connected to a corresponding touch electrode TE, for touch driving and touch sensing. One contact hole CP may be provided for an electrical connection between a first touch line TL1 and a touch electrode TE which is first disposed in a left upper portion, but a plurality of contact holes CP may be provided to establish an electrical connection. In this case, an electrical resistance between the first touch line TL1 and the touch electrode TE can be lowered.

In the touch display device TDD according to embodiments of the present application, as illustrated in FIG. 1, the plurality of touch lines TL may be disposed on a layer different from the plurality of touch electrodes TE and may be provided to overlap the plurality of touch electrodes TE. In this case, a separate area for the touch lines is not needed, and thus, an additional aperture ratio of the display panel DP is secured. However, the plurality of touch lines TL may be disposed on a layer which is different from or the same as the plurality of touch electrodes TE, and may be provided not to overlap the plurality of touch electrodes TE.

The touch display device TDD according to embodiments of the present application may include the plurality of touch electrodes TE and the plurality of subpixels SP, and in this case, a size of each of the touch electrodes TE may be set relatively greater than that of each of the subpixels SP. That is, a size of each of the touch electrodes TE may be set greater than a smallest area, contacting a tip of a conductive pen or a finger of a user, of the display panel DP to enable the occurrence or not of a touch to be determined, and thus, a size of width×length of each touch electrode TE may be within a range of "1 mm×1 mm" to "10 mm×10 mm". However, each subpixel may be provided relatively less than a size of each touch electrode TE.

Figure 2:
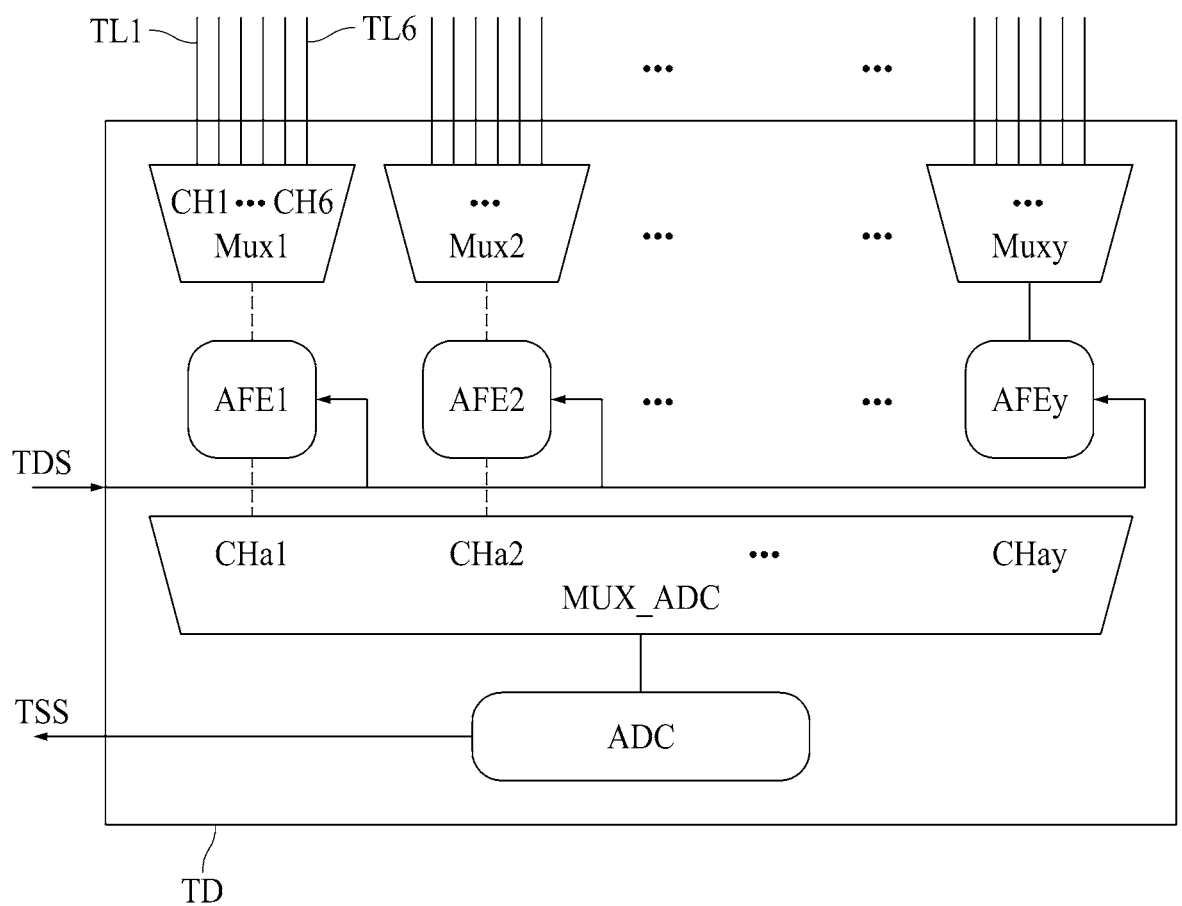
FIG. 2 is a diagram schematically illustrating a touch driving circuit of a touch display device according to embodiments of the present application.

FIG. 2 is a diagram schematically illustrating the touch driving circuit TD of the touch display device TDD according to embodiments of the present application.

The touch driving circuit TD according to embodiments of the present application may include a plurality of touch driving/sensing multiplexers Mux1 to Muxy, a plurality of touch driving/sensing units AFE1 to AFEy, an ADC multiplexer MUX_ADC, and a digital converter ADC.

The plurality of touch driving/sensing multiplexers Mux1 to Muxy may be connected to a plurality of touch lines TL connected to a plurality of touch electrodes TE. In this case, the number of the touch driving/sensing multiplexers Mux1 to Muxy may be equal to the number of the touch driving/sensing units AFE1 to AFEy. Also, the number of channels CHa1 to CHay of the ADC multiplexer MUX_ADC may be equal to the number of the touch driving/sensing units AFE1 to AFEy.

Moreover, the touch driving circuit TD may receive the touch driving signal TDS from the touch control circuit CTL or another external circuit and may apply the touch driving signal TDS to the plurality of touch driving/sensing units AFE1 to AFEy.

The touch driving circuit TD according to embodiments of the present application, for example, may apply the touch driving signal TDS to a first touch driving/sensing unit AFE1, and the first touch driving/sensing unit AFE1 may apply the touch driving signal TDS to the plurality of touch electrodes TE through a first touch driving/sensing multiplexer Mux1 and a plurality of touch lines TL1 to TL6 to sense a capacitance variation of the touch electrode TE. In this case, the first touch driving/sensing multiplexer Mux1 may include a plurality of touch channels CH1 to CH6 connected to the plurality of touch lines TL1 to TL6. In this case, the first touch driving/sensing multiplexer Mux1 may sequentially apply the touch driving signal TDS to the plurality of touch lines TL1 to TL6 in a predetermined order. However, according to a touch driving method, the first touch driving/sensing multiplexer Mux1 may simultaneously apply the touch driving signal TDS to one or more of the plurality of touch lines TL1 to TL6.

The first touch driving/sensing unit AFE1 of the touch driving circuit TD according to embodiments of the present application may transfer a capacitance variation of the touch electrode TE to the ADC multiplexer MUX_ADC. At this time, the ADC multiplexer MUX_ADC may transfer the transferred capacitance variation to the analog to digital converter ADC in a predetermined order. At this time, the analog to digital converter ADC may convert the transferred capacitance variation into a digital value. Also, the touch driving circuit TD may output the touch sensing signal TSS in order for the capacitance variation having the digital value to be again transferred to the touch control circuit CTL. Accordingly, the touch control circuit CTL may determine the occurrence or not of a touch and may detect touch coordinates, based on the capacitance variation having the digital value.

Figure 3:
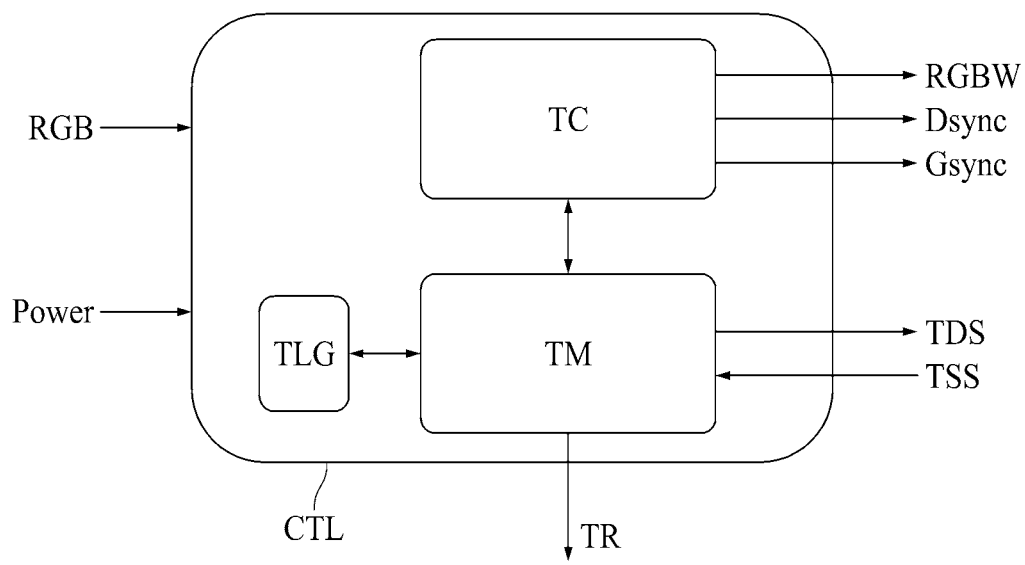
FIG. 3 is a diagram schematically illustrating a touch control circuit of a touch display device according to embodiments of the present application.

FIG. 3 is a diagram schematically illustrating the touch control circuit CTL of the touch display device TDD according to embodiments of the present application.

The touch control circuit CTL according to embodiments of the present application may be designed to control the gate driving circuit GD and the data driving circuit DD as well as the touch driving circuit TD.

The touch control circuit CTL according to embodiments of the present application may include a timing controller TC, a touch core TM, and a touch logic TLG.

Moreover, in a case where the touch control circuit CTL controls up to the gate driving circuit GD, the timing controller TC may apply a gate control signal Gsync, which allows the gate driving circuit GD to apply a gate driving signal to the plurality of gate lines GL to control the switching element of the display panel DP, to the gate driving circuit GD.

Moreover, in a case where the touch control circuit CTL controls up to the data driving circuit DD, the timing controller TC of the touch control circuit CTL may apply a data control signal Dsync, which allows the data driving circuit DD to apply data voltages to the plurality of data lines DL to control pixel voltages of the display panel DP, to the data driving circuit DD.

Moreover, in a case where the touch control circuit CTL controls up to the data driving circuit DD, the touch control circuit CTL may receive an image signal RGB from the outside. Also, the image signal RGB received from the outside may be converted into a panel image signal RGBW through a predetermined conversion operation. Also, the timing controller TC of the touch control circuit CTL may transfer the panel image signal RGBW for image display to the data driving circuit DD, thereby allowing the data driving circuit DD to apply a data voltage to a corresponding the plurality of subpixels through a data line DL.

The touch control circuit CTL according to embodiments of the present application may receive a source voltage Power from the outside. The source voltage Power may be a voltage for driving the touch driving circuit CTL. Also, the source voltage Power may be used as a voltage for driving the data driving circuit DD, the gate driving circuit GD, or the touch driving circuit TD.

The touch control circuit CTL according to embodiments of the present application may include the touch core TM, and the touch core TM may generate and output the touch driving signal TDS. Also, the touch core TM may determine the occurrence or not of a touch and may calculate a touch position to output a touch report TR representing touch coordinates to a host system, based on the touch sensing signal TSS transferred from the touch driving circuit TD.

The touch core TM of the touch control circuit CTL according to embodiments of the present application may receive setting information and characteristic information about the touch driving signal TDS from the touch logic TLG. The characteristic information about the touch driving signal TDS may be a waveform of the touch driving signal TDS, an amplitude voltage of the touch driving signal TDS corresponding to a difference between a first voltage level and a second voltage level of the touch driving signal TDS, or information corresponding to one period of a pulse of the touch driving signal TDS. Also, the setting information or the characteristic information about the touch driving signal TDS may be stored in the touch logic TLG in the form of a lookup table.

Figure 4:
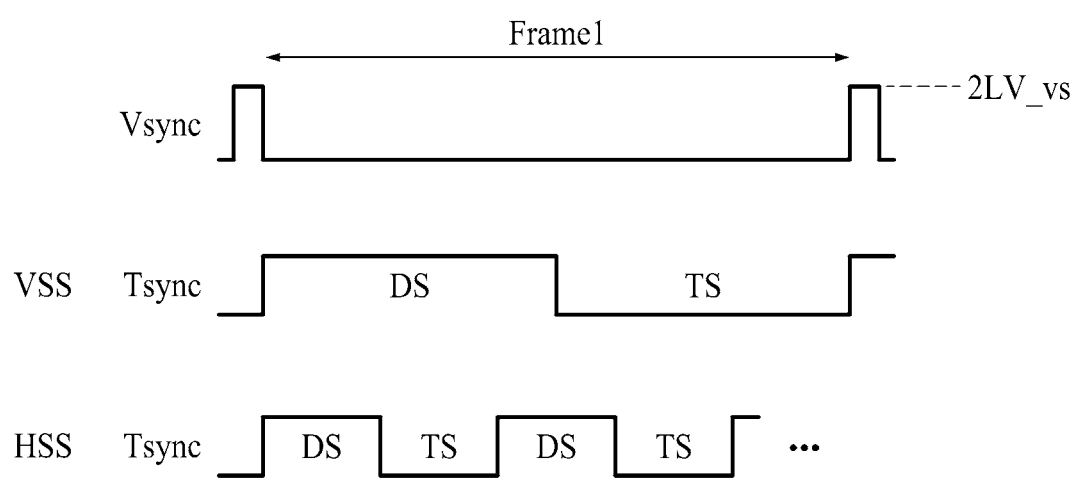
FIG. 4 is a timing diagram showing a display driving period and a touch driving period based on a V sensing driving method and an H sensing driving method of a touch display device according to embodiments of the present application.

FIG. 4 is a timing diagram showing a display driving period DS and a touch driving period TS based on a V sensing (VSS) driving method and an H sensing (HSS) driving method of the touch display device TDD according to embodiments of the present application.

In the touch display device TDD according to embodiments of the present application, a display frame period may be set based on a vertical sync signal Vsync. That is, an interval between a pulse having a second level 2LV_vs of the vertical sync signal Vsync and a pulse having the same second level 2LV_vs may be defined as a time taken in reproducing an image in the display panel DP once.

In describing a display driving and touch driving method of the touch display device TDD according to embodiments of the present application, only details relevant to time-divisional driving will be described.

In FIG. 4, the V sensing (VSS) driving method of the touch display device TDD according to embodiments of the present application may be a driving method where each of the display driving period DS and the touch driving period TS is executed only once during one display frame (Frame1) period. Since conversion of the driving method is performed only once during one display frame (Frame1) period, interference between the display driving period DS and the touch driving period TS is minimized, and driving may be performed. In this case, in the V sensing (VSS) driving method, the display driving period DS may be first started, but the V sensing (VSS) driving method may be previously set in order for the touch driving period TS to be first started.

In FIG. 4, the H sensing (HSS) driving method of the touch display device TDD according to embodiments of the present application may be a driving method where the display driving period DS is executed twice or more or the touch driving period TS is executed twice or more during one display frame (Frame1) period. Since the touch driving period TS is executed earlier in time than the V sensing (VSS) driving method, the touch report TR may be generated at an earlier time. In this case, in the H sensing (HSS) driving method, the display driving period DS may be first started, but the H sensing (HSS) driving method may be previously set in order for the touch driving period TS to be first started.

FIGS. 5A and 5B are diagrams showing a data sheet and a table of the touch control circuit CTL or the touch driving circuit TD where a waveform of the touch driving signal TDS of the touch display device TDD according to embodiments of the present application is selectively set.

FIG. 5A is a table showing an option pin (hereinafter referred to as a pin) data sheet of the touch control circuit CTL, where a waveform of the touch driving signal TDS of the touch display device TDD according to embodiments of the present application is selectively set, or an option pin (hereinafter referred to as a pin) data sheet of the touch driving circuit TD. In description below, an example of controlling a pin of the touch driving circuit TD will be described. For example, a pin of the touch control circuit CTL corresponding to T1 may be set to 0 or 1. For example, when a bit value corresponding to a pin T1 is set to 0, an Enable setting is made to selectively use a waveform of the touch driving signal TDS. In this case, referring to a waveform table of FIG. 5B, it may be set to use a waveform of a corresponding touch driving signal TDS, based on a bit value of a pin corresponding to T2 of the touch control circuit CTL, a bit value of a pin corresponding to T3, and a bit value of a pin corresponding to T4.

The touch control circuit CTL or the touch driving circuit TD, where a waveform of the touch driving signal TDS of the touch display device TDD according to embodiments of the present application is selectively set, may be set so that the kind of a waveform of the touch driving signal TDS is changed based on a set value of pin corresponding to T1. For example, when a bit value corresponding to a pin T1 is set to 0, the waveform of the touch driving signal TDS may be set in order for a non-sinusoidal wave to be output. Also, when a bit value corresponding to a pin T1 is set to 1, the waveform of the touch driving signal TDS may be set in order for a sine wave to be output. Also, a setting is made so that a touch driving signal TDS having flatness TWR of a corresponding touch driving signal TDS is output based on values set in pins corresponding to T2, T3, and T4. The embodiments of the present application do not limit the number of pins corresponding to T1, T2, T3, and T4 to four, but may be set to more or less as necessary.

FIG. 5B is a waveform table showing the kind of a waveform based on a bit value which is set in a pin of the touch control circuit CTL or the touch driving signal TD so that a waveform of the touch driving signal TDS of the touch display device TDD according to embodiments of the present application is selectively set. In the waveform table of FIG. 5B, the kinds and number of waveforms are not limited to embodiments of the present application, and depending on the case, the kinds and number of more waveforms may be previously set and stored in the waveform table.

Referring to the waveform table of FIG. 5B, when a bit value of a pin corresponding to T2 of the touch control circuit CTL or the touch driving circuit TD of the touch display device TDD according to embodiments of the present application, a bit value of a pin corresponding to T3, and a bit value of a pin corresponding to T4 are respectively set to 0, 0, and 1, a waveform of the touch driving signal TDS of the touch control circuit CTL or the touch driving circuit TD is output as a waveform having flatness TWR of 25%. Here, in order to help understand a meaning of the flatness TWR, the flatness TWR will be described below with reference to FIG. 6.

Figure 6:
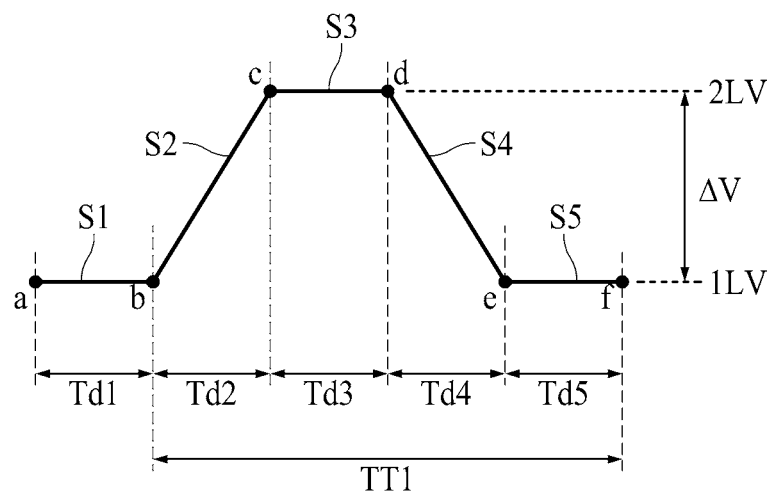
FIG. 6 is a diagram schematically showing a waveform of a touch driving signal corresponding to a non-sinusoidal wave of waveforms of a touch driving signal of a touch display device according to embodiments of the present application.

FIG. 6 is a diagram schematically showing a waveform of the touch driving signal TDS corresponding to a non-sinusoidal wave among waveforms of the touch driving signal TDS of the touch display device TDD according to embodiments of the present application.

One pulse of a waveform of the touch driving signal TDS corresponding to a non-sinusoidal wave according to embodiments of the present application may have a first voltage level 1LV corresponding to a reference voltage and a second voltage level 2LV which is relatively higher than the reference voltage. In this case, a voltage difference between the first voltage level 1LV and the second voltage level 2LV may be defined as an amplitude voltage $\Delta V$ of the touch driving signal TDS.

One pulse of a waveform of the touch driving signal TDS corresponding to a non-sinusoidal wave according to embodiments of the present application may be divided by several unit times based on a variation of a voltage level. That is, the one pulse of the waveform of the touch driving signal TDS corresponding to the non-sinusoidal wave may be divided into a first unit period Td1 where a voltage maintains the first voltage level 1LV without variation in voltage, a second unit period Td2 where a variation of a voltage has a slope S2 and the voltage varies to the second voltage level 2LV, a third unit period Td3 where a voltage maintains the second voltage level 2LV without variation in voltage, a fourth unit period Td4 where a variation of a voltage has a slope of S4 and the voltage varies from the second voltage level 2LV to the first voltage level 1LV, and a fifth unit period Td5 where a voltage maintains the first voltage level 1LV without variation in voltage. In this case, there is no variation of a voltage in the first unit period Td1, but the voltage may vary by a certain level in the first unit period Td1 due to an internal or external state or condition of the touch display device TDD or noise. That is, S1 representing a slope between an a point and a b point is close to 0, but may have a slight variation caused by an internal or external influence of the touch display device TDD. Likewise, the same phenomenon can occur even in the third unit period Td3 and the fifth unit period Td5, and thus, a voltage can vary by a certain level.

A variation of a voltage in the second unit period Td2 of a pulse of the touch driving signal TDS corresponding to a non-sinusoidal wave according to embodiments of the present application and a variation of a voltage in the fourth unit period Td4 may be linearly made as shown in FIG. 6, but are not limited thereto. That is, the variation of the voltage in the second unit period Td2 and the variation of the voltage in the fourth unit period Td4 may be nonlinearly made. For example, the voltage in the second unit period Td2 and the voltage in the fourth unit period Td4 may vary identically or similarly to at least a portion of a graph of a predetermined function. Here, the predetermined function may be determined as an exponential function, a logarithmic function, a sine function, a cosine function, a step function, or the like. Also, the predetermined function may be one function or a function including a combination of two or more functions.

The variation of the voltage in the second unit period Td2 and the variation of the voltage in the fourth unit period Td4 according to embodiments of the present application may have a symmetrical relationship with respect to the third unit period Td3, but may be set to an asymmetrical relationship.

Here, a meaning of the flatness TWR will be described. The flatness TWR may denote a ratio of a time of the third unit period Td3 to a sum of a time of the second unit period Td2 and a time of the third unit period Td3 in one pulse of the touch driving signal TDS. For example, when the time of the second unit period Td2 is 1 µs and the time of the third unit period Td3 is 1 µs, the flatness TWR corresponds to ½ and is 50%. As another example, when the time of the second unit period Td2 is 0.75 µs and the time of the third unit period Td3 is 0.25 µs, the flatness TWR is 25%.

In embodiments of the present application, a method of defining the flatness TWR is not limited to the above-described method, and the flatness TWR may be defined by other methods. For example, the flatness TWR may be defined as a ratio of a time of the third unit period Td3 to a sum of a time of the second unit period Td2, a time of the third unit period Td3, and a time of the fourth unit period Td4 in one pulse of the touch driving signal TDS. In this case, for example, when the time of the second unit period Td2 is 2 µs, the time of the third unit period Td3 is 1 µs, and the time of the fourth unit period Td4 is 2 µs, the flatness TWR corresponds to ⅕ and is 20%.

In embodiments of the present application, a method of defining the flatness TWR is not limited to the above-described method, and the flatness TWR may be defined by other methods. For example, the flatness TWR may be defined as a ratio of a time of the fifth unit period Td5 to a sum of a time of the fourth unit period Td4 and the time of the fifth unit period Td5 in one pulse of the touch driving signal TDS. In this case, for example, when the time of the fourth unit period Td4 is 3 µs and the time of the fifth unit period Td5 is 2 µs, the flatness TWR corresponds to ⅖ and is 40%.

When flatness TWR of the touch driving signal TDS of the touch display device TDD according to embodiments of the present application is close to 0%, this denotes that a time of the third unit period Td3 is almost close to 0 (zero), and thus, a waveform of the touch driving signal TDS denotes a waveform close to a triangle. Also, when the flatness TWR of the touch driving signal TDS of the touch display device TDD according to embodiments of the present application is close to 100%, this denotes that a time of the second unit period Td2 is almost close to 0 (zero), and thus, the waveform of the touch driving signal TDS denotes a waveform close to a quadrangle.

A time of the second unit period Td2 and a time of the fourth unit period Td4 of a waveform of the touch driving signal TDS corresponding to a non-sinusoidal wave according to embodiments of the present application may be set as the same time, or may be set as different times.

One period TT1 of a pulse of a waveform of the touch driving signal TDS corresponding to a non-sinusoidal wave according to embodiments of the present application, as shown in FIG. 6, may be defined as a period from a time, when the second unit period Td2 starts, to a time when the second unit period Td2 ends. However, the present embodiment is not limited thereto. For example, the one period TT1 of the pulse of the waveform of the touch driving signal TDS may be defined as a period from a time, when the first unit period Td1 starts, to a time when the fourth unit period Td4 ends. As another example, the one period TT1 of the pulse of the waveform of the touch driving signal TDS may be defined as a period from a time, when the first unit period Td1 starts, to a time when the fifth unit period Td5 ends.

Hereinafter, embodiments of the present application shown in FIGS. 5A and 5B will be described again.

When a bit value of a pin corresponding to T2 of the touch control circuit CTL or the touch driving circuit TD of the touch display device TDD according to embodiments of the present application, a bit value of a pin corresponding to T3, and a bit value of a pin corresponding to T4 are respectively set to 1, 0, and 1, a waveform of the touch driving signal TDS of the touch control circuit CTL or the touch driving circuit TD is set to be output as a waveform corresponding to a sine wave.

When a bit value of a pin corresponding to T2 of the touch control circuit CTL or the touch driving circuit TD of the touch display device TDD according to embodiments of the present application, a bit value of a pin corresponding to T3, and a bit value of a pin corresponding to T4 are respectively set to 1, 1, and 0, a setting is made so that a waveform of the touch driving signal TDS of the touch control circuit CTL or the touch driving circuit TD is set to an adjustable state. This is a method where a waveform is set to be selectively changed to an appropriate waveform according to an internal or external environment of the touch display device TDD, without using only the touch driving signal TDS corresponding to one predetermined waveform. For example, a waveform of the touch driving signal TDS may be set to be automatically changed based on a predetermined time or a predetermined condition.

A waveform of the touch driving signal TDS of the touch display device TDD according to embodiments of the present application may be set to be changed to a waveform having low energy consumption, based on a driving time of the touch display device TDD. For example, the touch driving signal TDS of the touch display device TDD may be set to have initial flatness TWR of 75% and drive, and then, if the driving time of the touch display device TDD exceeds 10,000 hours, the touch driving signal TDS may be set in order for flatness TWR to be changed to 75%. Also, if the driving time of the touch display device TDD additionally exceeds 20,000 hours, the touch driving signal TDS may be again set in order for flatness TWR to be changed to 25%.

A waveform of the touch driving signal TDS of the touch display device TDD according to embodiments of the present application may be set to be changed based on a condition. For example, in a case where the touch display device TDD according to embodiments of the present application is a mobile phone, if the balance of a battery of the mobile phone is lowered to 15% or less, a waveform of the touch driving signal TDS may be set to be changed to a waveform having low energy consumption. For example, a waveform of the touch driving signal TDS may be set to have initial flatness TWR of 50% and drive, and then, if the balance of the battery is lowered to 15% or less, the waveform of the touch driving signal TDS may be set to have flatness TWR of 25% and drive automatically, or may be set as a sine wave and driven.

A waveform of the touch driving signal TDS of the touch display device TDD according to embodiments of the present application may be set to be changed based on another condition. For example, in a case where an internal or external temperature of the touch display device TDD rises, the waveform of the touch driving signal TDS may be set to have initial flatness TWR of 50% and drive, and then, the waveform of the touch driving signal TDS may be set to have flatness TWR of 25% and drive automatically.

A waveform of the touch driving signal TDS of the touch display device TDD according to embodiments of the present application may be set to be changed based on another condition. For example, in a case where an internal or external noise signal of the touch display device TDD increases, the waveform of the touch driving signal TDS may be set to have initial flatness TWR of 25% and drive, and then, the waveform of the touch driving signal TDS may be set to have flatness TWR of 50% and drive automatically.

A waveform of the touch driving signal TDS of the touch display device TDD according to embodiments of the present application may be set to be changed based on another condition. For example, based on a touch sensing method of the touch driving signal TDS of the touch display device TDD, a waveform of the touch driving signal TDS may be appropriately changed. That is, in a case where the touch driving circuit TD is designed to apply the touch driving signal TDS having flatness of 30% or more to a touch electrode TE to sense a touch, the touch driving signal TDS of the touch display device TDD may be previously set to be output with flatness TWR of 30% or more.

When a bit value of a pin corresponding to T2 of the touch control circuit CTL or the touch driving circuit TD of the touch display device TDD according to embodiments of the present application, a bit value of a pin corresponding to T3, and a bit value of a pin corresponding to T4 are respectively set to 1, 1, and 1, a waveform of the touch driving signal TDS of the touch control circuit CTL or the touch driving circuit TD may be set to be output as a random waveform. This denotes that a waveform of the touch driving signal TDS is set to be randomly selected and output without using only the touch driving signal TDS corresponding to one predetermined waveform.

In a case where a waveform of the touch driving signal TDS of the touch display device TDD according to embodiments of the present application is randomly output, the waveform of the touch driving signal TDS may be selected from a waveform list predetermined based on a random variable without a predetermined order and output. In this case, a time when a predetermined waveform is output may be randomly set, but the predetermined waveform may be set to be output within a predetermined time range. For example, a plurality of touch driving signals TDS may be applied in a touch driving period TS in one display frame Frame1, and in this case, the touch driving signals TDS may be driven as a first waveform during 1,000 frames corresponding to a predetermined time, and then, may be driven as a second waveform during a predetermined 1,000-frame period.

The touch display device TDD according to embodiments of the present application may previously set the touch control circuit CTL or the touch driving circuit TD so that a waveform of the touch driving signal TDS is output as a sine wave or with flatness of 75% or less. A waveform of the sine wave or a waveform having flatness of 75% or less has no rapid variation of a voltage level in comparison to a waveform having flatness of 100%, and since there is no rapid variation of a voltage level, an inrush current occurs relatively low in the touch display device TDD. Therefore, when the waveform of the touch driving signal TDS is a sine wave or has flatness of 75% or less, the plurality of touch driving/sensing units AFE or another circuit unit of the touch driving circuit TDD may be designed to have a narrow bandwidth in comparison to a waveform having flatness of 100% where the inrush current occurs much. Accordingly, in a case of desiring to narrowly design the bandwidth of the plurality of touch driving/sensing units AFE or the other circuit unit of the touch driving circuit TDD or to small design the number or sizes of elements of the circuit unit, a setting may be made by selecting the touch driving signal TDS having a sine wave or a waveform having flatness of 75%.

In the touch display device TDD according to embodiments of the present application, a touch driving signal TDS output from the touch driving circuit TD may actually differ from a touch driving signal TDS which is transferred to a touch electrode TE when applied to the display panel DP. That is, since a plurality of lines and a plurality of electrodes are provided in the display panel DP and various display signals different from the touch driving signal TDS are applied to the display panel DP, a characteristic of the touch driving signal TDS is changed in a transfer process, and thus, a waveform of the touch driving signal TDS at a point from which the touch driving signal TDS is output differs from that of the touch driving signal TDS at a point to which the touch driving signal TDS is finally transferred.

For example, the touch driving signal TDS at a point from which the touch driving signal TDS is output and the touch driving signal TDS at a point to which the touch driving signal TDS is finally transferred may have one or more different characteristics of a phase, a level, a frequency, a form, etc. Also, a rectilinear component at a point from which a waveform of the touch driving signal TDS is output may be changed to a curve component or another form at a point to which the touch driving signal TDS having the rectilinear component is finally transferred.

Figure 7:
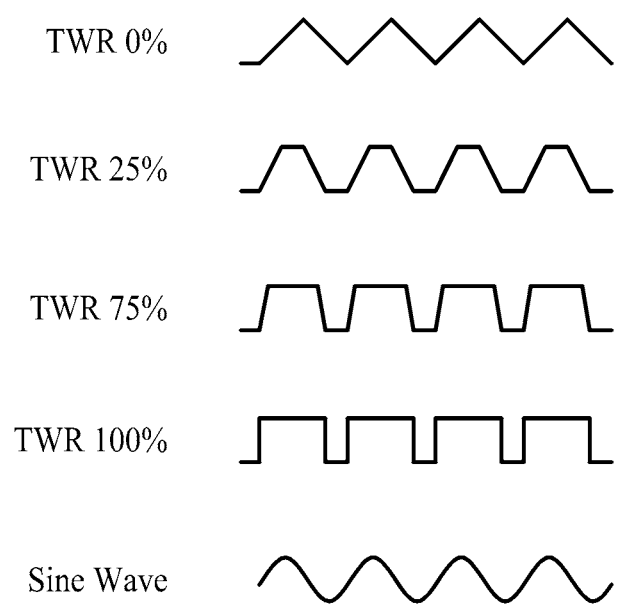
FIG. 7 is a diagram exemplarily showing various waveforms of a touch driving signal of a touch display device according to embodiments of the present application.

FIG. 7 is a diagram exemplarily showing various waveforms of the touch driving signal TDS of the touch display device TDD according to embodiments of the present application. For example, when a waveform of the touch driving signal TDS is selected to have flatness of 0%, the waveform of the touch driving signal TDS may be a signal close to a triangle. For example, when the waveform of the touch driving signal TDS is selected to have flatness TWR of 25%, the touch driving signal TDS may have a period of a third unit period Td3 which is shorter than a case which is selected to have flatness TWR of 75%, and thus, a voltage variation slope S2 in a second unit period Td2 may have a gentler value (a small value). Also, when the waveform of the touch driving signal TDS is selected to have flatness of 100%, the waveform of the touch driving signal TDS may be a signal close to a quadrangle. Also, when the waveform of the touch driving signal TDS is selected as a sine wave, the touch driving signal TDS may be a curve-form signal where a variation of a voltage is gentler than a signal corresponding to a non-sinusoidal wave.

In FIGS. 5A, 5B, 6, and 7, the touch control circuit CTL or the touch driving circuit TD capable of selectively and previously setting various waveforms of the touch driving signal TDS of the touch display device TDD according to embodiments of the present application has been described above. Also, the touch display device TDD according to embodiments of the present application is not limited thereto, and it is possible to implement a touch control circuit CTL or a touch driving circuit TD capable of variously changing and selectively and previously setting another characteristic of the touch driving signal TDS.

The touch control circuit CTL of the touch display device TDD according to embodiments of the present application may be previously set to selectively change an amplitude voltage ΔV of the touch driving signal TDS among characteristics of the touch driving signal TDS. For example, a bit value of a corresponding pin of the touch control circuit CTL may be previously set in order for the amplitude voltage ΔV of the touch driving signal TDS to become 4.5V. As another example, a bit value of a corresponding pin of the touch control circuit CTL may be previously set in order for the amplitude voltage ΔV of the touch driving signal TDS to become 6.5V.

In a case where the amplitude voltage ΔV of the touch driving signal TDS of the touch display device TDD according to embodiments of the present application is previously set to be selectively changed, the amplitude voltage ΔV of the touch driving signal TDS may be applied identically to all the above-described embodiments of the present application corresponding to a case where the waveform of the touch driving signal TDS is selectively and previously set, or may be appropriately changed and applied. Accordingly, a detailed description of a case where amplitude voltage ΔV of the touch driving signal TDS is previously set to be selectively changed is omitted.

The touch control circuit CTL of the touch display device TDD according to embodiments of the present application may be previously set so that one period TT1 of a pulse of the touch driving signal TDS among characteristics of the touch driving signal TDS is selectively changed. For example, a bit value of a corresponding pin of the touch control circuit CTL may be previously set in order for the one period TT1 of the pulse of the touch driving signal TDS to become 1 μs. As another example, a bit value of a corresponding pin of the touch control circuit CTL may be previously set in order for the one period TT1 of the pulse of the touch driving signal TDS to become 2 μs.

In a case where the one period TT1 of the pulse of the touch driving signal TDS of the touch display device TDD according to embodiments of the present application is previously set to be selectively changed, the one period TT1 of the pulse of the touch driving signal TDS may be applied identically to all the above-described embodiments of the present application corresponding to a case where the waveform of the touch driving signal TDS is selectively and previously set, or may be appropriately changed and applied. Accordingly, a detailed description of a case where the one period TT1 of the pulse of the touch driving signal TDS is previously set to be selectively changed is omitted.

Figure 8A:
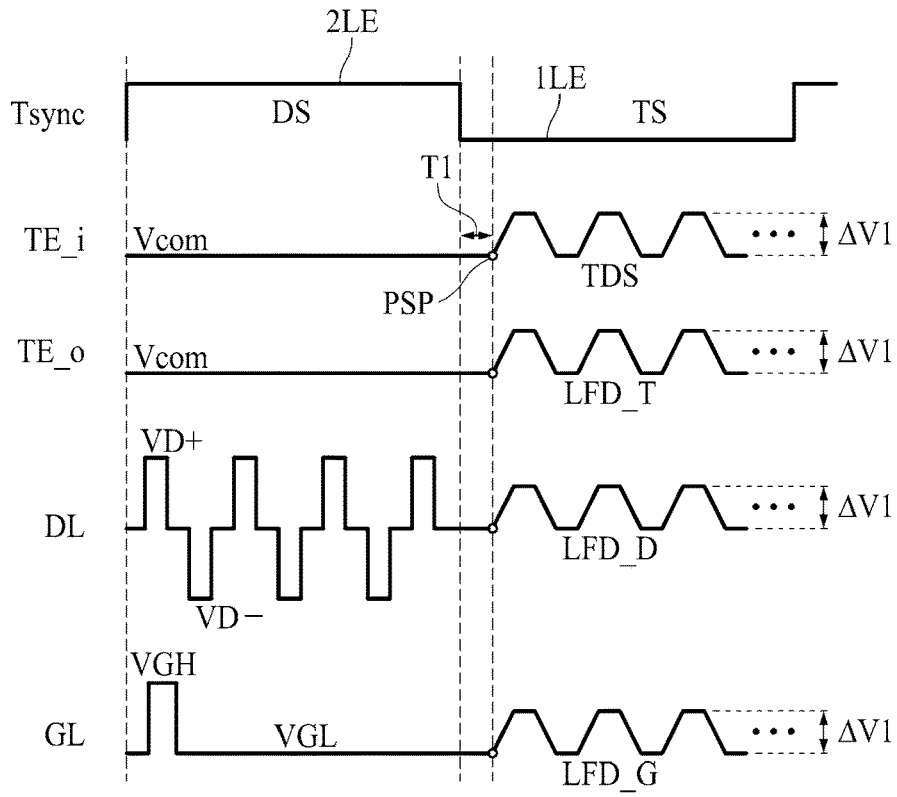
FIG. 8A is a diagram schematically showing display signals, applied to a display panel during a display driving period of a touch display device according to embodiments of the present application, and a touch driving signal and load free signals applied to a display panel during a touch driving period.

FIG. 8A is a diagram schematically showing display signals, applied to a touch electrode TE, a data line DL, and a gate line GL of the display panel DP during the display driving period DS of the touch display device TDD according to embodiments of the present application, and the touch driving signal TDS and load free signals applied to the touch electrode TE, the data line DL, and the gate line GL of the display panel DP during the touch driving period TS. Here, the touch display device TDD according to embodiments of the present application has been described above on the V sensing driving method, but may be identically applied to an H sensing driving method.

Referring to FIG. 8A, the touch display device TDD according to embodiments of the present application may divisionally operate in the display driving period DS and the touch driving period TS according to a touch control signal Tsync. During the display driving period DS based on a period where the touch control signal Tsync is maintained at a second level 2LE, a common voltage Vcom may be applied to a touch electrode TE_i and another touch electrode TE_o of the display panel DP. In this case, the common voltage Vcom may be applied to an opposite electrode which generates an electric field along with a pixel electrode, which is opposite to the opposite electrode, of a subpixel SP of the display panel DP. Also, data voltages VD+ and VD− may be applied to the plurality of data lines DL. In this case, if the touch display device is an LCD device, since liquid crystal is inverted at periods and driven, the LCD device may be driven by alternately inverting polarities of the data voltages VD+ and VD−. Also, a gate high voltage VGH or a gate low voltage VGL may be applied to the plurality of gate lines GL according to a corresponding gate control signal Gsync.

In the touch display device TDD according to embodiments of the present application, during the display driving period DS based on a period corresponding to a first level 1LE of the touch control signal Tsync, when the touch driving signal TDS is applied to one touch electrode TE_i, a load free signal LFD_T may be applied to a plurality of other touch electrodes TE_o. At this time, the touch driving signal TDS and the load free signal LFD_T may be output from the touch control circuit CTL. In this case, the touch driving signal TDS applied to the touch electrode TE_i may be a signal for sensing a capacitance variation of the touch electrode TE_i, but the load free signal LFD_T applied to the plurality of other touch electrodes TE_o may not be a signal for sensing the other touch electrodes TE_o. Therefore, a potential difference does not occur between the touch electrode TE_i to which the touch driving signal TDS is applied and the other touch electrodes TE_o to which the load free signal LFD_T is applied, and thus, parasitic capacitances between the touch electrode TE_i and the plurality of other touch electrodes TE_o are not minimized or removed.

In the touch display device TDD according to embodiments of the present application, when the touch driving signal TDS is applied to at least one touch electrode TE_i during the touch driving period TS, a load free signal LFD_D may be applied to a plurality of other data lines DL. At this time, the touch driving signal TDS and the load free signal LFD_D may be output from the touch control circuit CTL. Therefore, a potential difference does not occur between the touch electrode TE_i to which the touch driving signal TDS is applied and a plurality of data lines DL to which the load free signal LFD_D is applied, and thus, parasitic capacitances between the touch electrode TE_i and the plurality of data lines DL are not minimized or removed.

In the touch display device TDD according to embodiments of the present application, when the touch driving signal TDS is applied to at least one touch electrode TE_i during the touch driving period TS, a load free signal LFD_G may be applied to a plurality of other gate lines GL. At this time, the touch driving signal TDS and the load free signal LFD_G may be output from the touch control circuit CTL. Therefore, a potential difference does not occur between the touch electrode TE_i to which the touch driving signal TDS is applied and a plurality of gate lines GL to which the load free signal LFD_G is applied, and thus, parasitic capacitances between the touch electrode TE_i and the plurality of gate lines GL are not minimized or removed.

In the touch display device TDD according to embodiments of the present application, the load free signals LFD_T, LFD_D, and LFD_G may be the same signal as the touch driving signal TDS or a signal corresponding to the touch driving signal TDS. If the load free signals LFD_T, LFD_D, and LFD_G correspond to the touch driving signal TDS, the load free signals LFD_T, LFD_D, and LFD_G may have the same frequency as that of the touch driving signal TDS, or may have the same phase as that of the touch driving signal TDS. In this case, phases being the same denotes that two signals have the same period and are driven at the same timing. For example, a pulse of the touch driving signal TDS and pulses of the load free signals LFD_T, LFD_D, and LFD_G do not simultaneously start at a timing when the touch control signal Tsync is shifted from a second level 2LE to a first level 1LE. This denotes that the pulse of the touch driving signal TDS and the pulses of the load free signals LFD_T, LFD_D, and LFD_G have the same delay time T1 and start at the same time PSP. Also, the load free signals LFD_T, LFD_D, and LFD_G may have the same amplitude voltage $\Delta V1$ as an amplitude voltage $\Delta V1$ of the touch driving signal TDS. Also, the load free signals LFD_T, LFD_D, and LFD_G may be completely or substantially the same signals as the touch driving signal TDS, and signals for removing or reducing parasitic capacitances between a touch electrode TE for which touch sensing is to be performed and other electrodes or other lines may be used as the load free signals LFD_T, LFD_D, and LFD_G.

Here, the load free signals LFD_T, LFD_D, and LFD_G being completely the same as the touch driving signal TDS may denote that a frequency, a phase, an amplitude, and other signal features are completely the same. Also, the load free signals LFD_T, LFD_D, and LFD_G being substantially the same as the touch driving signal TDS may denote that a frequency, a phase, an amplitude, and other signal features are substantially the same. "Substantially same" denotes that two values actually differ, but if a difference degree is within a predetermined tolerance margin, the two values are regarded as the same values. For example, the tolerance margin may be ±20%, ±10%, ±5%, ±1%, or the like.

Figure 8B:
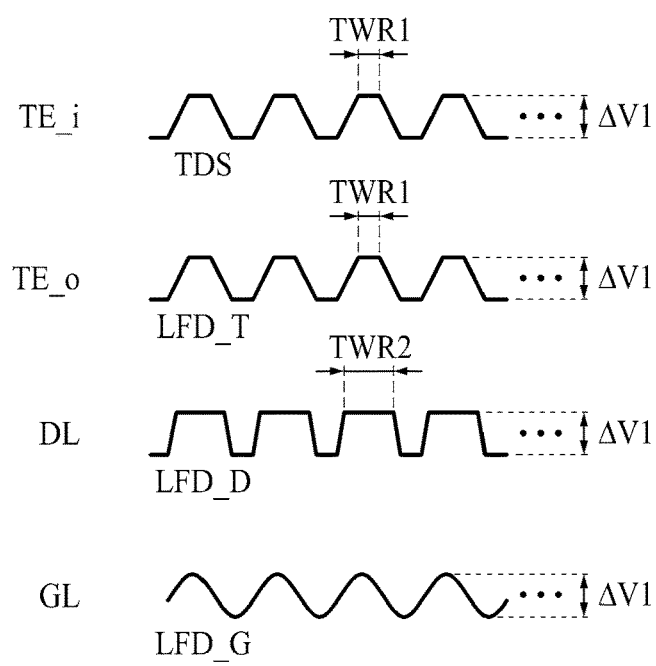
FIG. 8B is a diagram schematically showing a touch driving signal and load free signals having another waveform, which are applied to a display panel during a touch driving period of a touch display device according to embodiments of the present application.

FIG. 8B is a diagram schematically showing the touch driving signal TDS and load free signals having another waveform, which are applied to a touch electrode TE, a data line DL, and a gate line GL of the display panel DP during the touch driving period TS of the touch display device TDD according to embodiments of the present application.

Referring to FIG. 8B, in the touch driving period TS of the touch display device TDD according to embodiments of the present application, the touch driving signal TDS applied to a touch electrode TE_i may be applied as a waveform having flatness1 TWR1. Likewise, a load free signal LFD_T applied to another touch electrode TE_o may be applied as a waveform having the flatness1 TWR1. In this case, a load free signal LFD_D applied to a plurality of data lines DL may be a signal having a waveform having flatness2 TWR2. That is, the touch control circuit CTL may be previously set in order for the load free signal LFD_D to have a waveform different from that of the touch driving signal TDS. Also, a load free signal LFD_G applied to a plurality of gate lines GL may be a signal having a waveform corresponding to a sine wave. That is, the touch control circuit CTL may be previously set in order for the load free signal LFD_G to have a waveform different from that of the touch driving signal TDS.

The touch control circuit CTL may be previously set so that one or more of the load free signals LFD_T, LFD_D, and LFD_G applied in the touch driving period TS of the touch display device TDD according to embodiments of the present application become signals having a waveform different from that of the touch driving signal TDS. For example, in a method where touch performance is enhanced without being reduced, based on an internal or external environment or condition of the touch display device TDD, the touch control circuit CTL may be previously set so that the load free signals LFD_T, LFD_D, and LFD_G have a waveform different from that of the touch driving signal TDS.

The touch control circuit CTL may be set so that in a case of applying the load free signals LFD_T, LFD_D, and LFD_G having waveforms different from that of the touch driving signal TDS in the touch driving period TS of the touch display device TDD according to embodiments of the present application, the load free signals LFD_T, LFD_D, and LFD_G have characteristics which are completely or substantially the same as one or more of characteristics such as an amplitude, a phase, a frequency, and the like of the touch driving signal TDS. Therefore, parasitic capacitances between a touch electrode TE_i and another touch electrode TE_o, the plurality of data lines DL, and the plurality of gate lines GL can be minimized or removed.

Figure 8C:
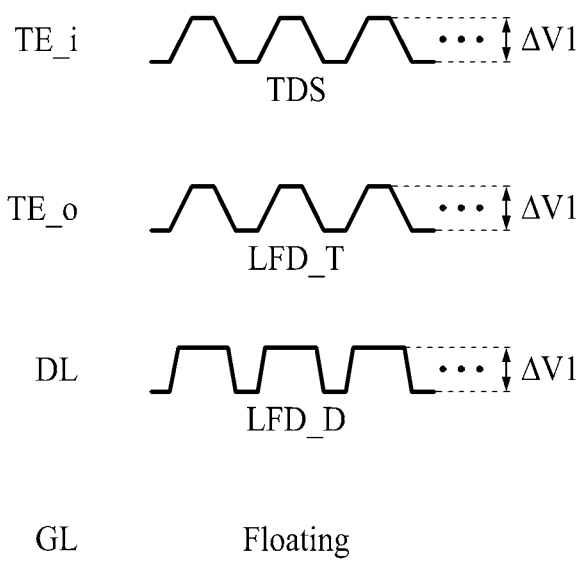
FIG. 8C is a diagram schematically showing a touch driving signal and load free signals applied to a display panel during a touch driving period of a touch display device according to embodiments of the present application.

FIG. 8C is a diagram schematically showing an operation of selectively controlling the touch driving signal TDS and load free signals applied to a touch electrode TE, a data line DL, and a gate line GL of the display panel DP in the touch driving period TS of the touch display device TDD according to embodiments of the present application.

Referring to FIG. 8C, the touch control circuit CTL of the touch display device TDD according to embodiments of the present application may be set to apply the touch driving signal TDS to a touch electrode TE_i in the touch driving period TDS. At this time, a load free signal LFD_T may be applied to a plurality of other touch electrodes TE_o. Likewise, a load free signal LFD_D may be applied to a plurality of data lines DL. However, the touch control circuit CTL may be set so that a plurality of gate lines GL are electrically floated without being supplied with a load free signal LFD_G. Also, the touch control circuit CTL of the touch display device TDD according to embodiments of the present application may be set so that the plurality of gate lines GL are electrically floated without being supplied with the load free signal LFD_D, or the plurality of other touch electrodes TE_o are electrically floated without being supplied with the load free signal LFD_T. For example, in a method where touch performance is enhanced without being reduced, based on an internal or external environment or condition of the touch display device TDD, the touch control circuit CTL may be previously set so that one or more of the plurality of other touch electrodes TE_o or one or more of the plurality of data lines DL or the plurality of gate lines GL are electrically floated.

The touch control circuit CTL may be previously set so that one or more of the load free signals LFD_T, LFD_D, and LFD_G applied in the touch driving period TS of the touch display device TDD according to embodiments of the present application are not selectively output. For example, in a method where touch performance is enhanced without being reduced, based on an internal or external environment or condition of the touch display device TDD, the touch control circuit CTL may be previously set so that one or more of the load free signals LFD_T, LFD_D, and LFD_G are not output.

The touch control circuit CTL may be set so that in a case where one or more of the load free signals LFD_T, LFD_D, and LFD_G are not selectively output in the touch driving period TS of the touch display device TDD according to embodiments of the present application, the load free signals LFD_T, LFD_D, and LFD_G have characteristics which are completely or substantially the same as one or more of characteristics such as an amplitude, a phase, a frequency, and the like of the touch driving signal TDS. Therefore, parasitic capacitances between a touch electrode TE_i and another touch electrode TE_o, the plurality of data lines DL, and the plurality of gate lines GL can be minimized or removed.

Figure 9A:
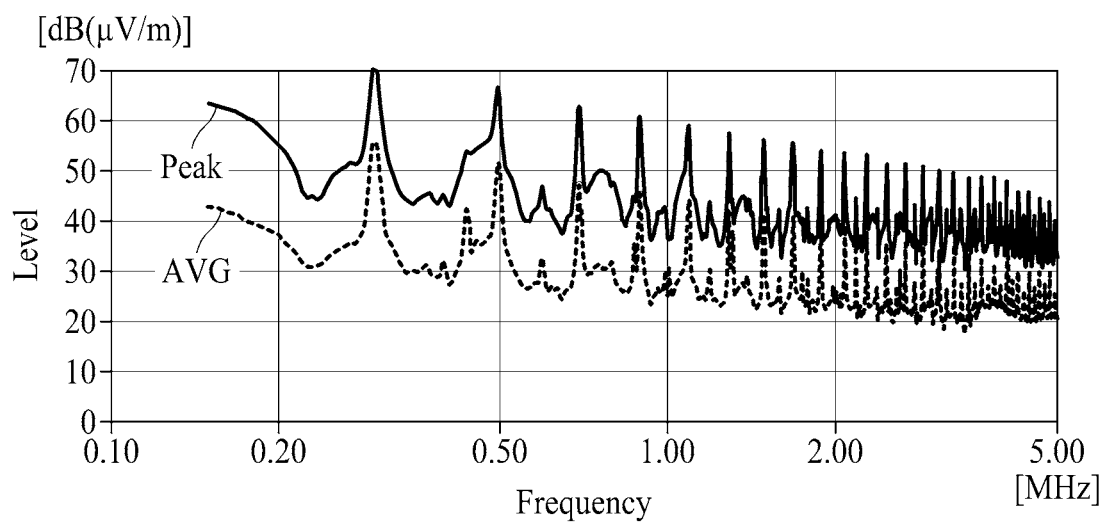
FIG. 9A is a graph showing an effect of EMI occurring between a related art touch device and an external electronic device.

FIG. 9A is a graph showing an effect of EMI occurring between a related art touch device and an external electronic device. In detail, FIG. 9A is a graph showing an effect of EMI occurring between the touch device and an external electronic device (for example, a radio, a vehicle, or the like) with respect to a frequency.

In this case, in the graph of FIG. 9A, a line located in an upper side represents a peak which is a highest value of an EMI effect, and a line located in a lower side represents an average AVG which is an average value of EMI effects. For example, it can be seen that in a frequency of 0.5 MHz, the peak is about 65 dB, and the average AVG is about 52 dB, with respect to an EMI effect.

Figure 9B:
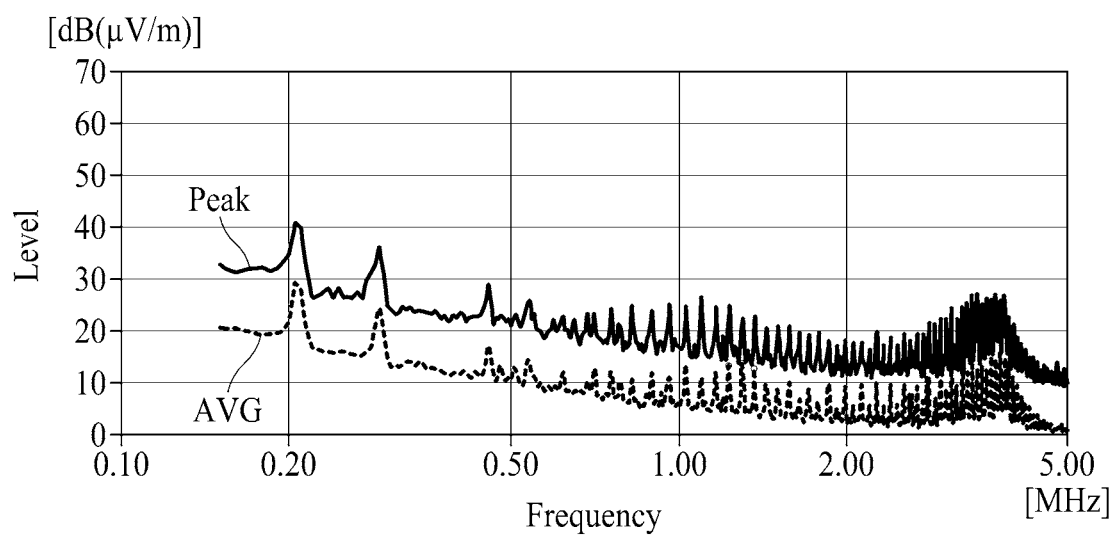
FIG. 9B is a graph showing an effect of EMI occurring between a touch display device according to embodiments of the present application and an external electronic device.

FIG. 9B is a graph showing an effect of EMI occurring between the touch display device TDD according to embodiments of the present application and an external electronic device. In detail, FIG. 9B is a graph showing an effect of EMI occurring between the touch display device TDD and an external electronic device (for example, a radio, a vehicle, or the like) with respect to a frequency in a case where flatness TWR of a waveform of the touch driving signal TDS of the touch display device TDD according to embodiments of the present application is previously set to 25%.

In this case, in the graph of FIG. 9B, a line located in an upper side represents a peak which is a highest value of an EMI effect, and a line located in a lower side represents an average AVG which is an average value of EMI effects. For example, in an effect of EMI occurring between the touch display device TDD according to embodiments of the present application and an external electronic device, it can be seen that in a frequency of 0.5 MHz, the peak is about 25 dB, and the average AVG is about 14 dB, with respect to an EMI effect. Accordingly, in comparison to the related art, it can be seen that in the touch display device TDD according to embodiments of the present application, EMI effect is greatly reduced.

Figure 10:
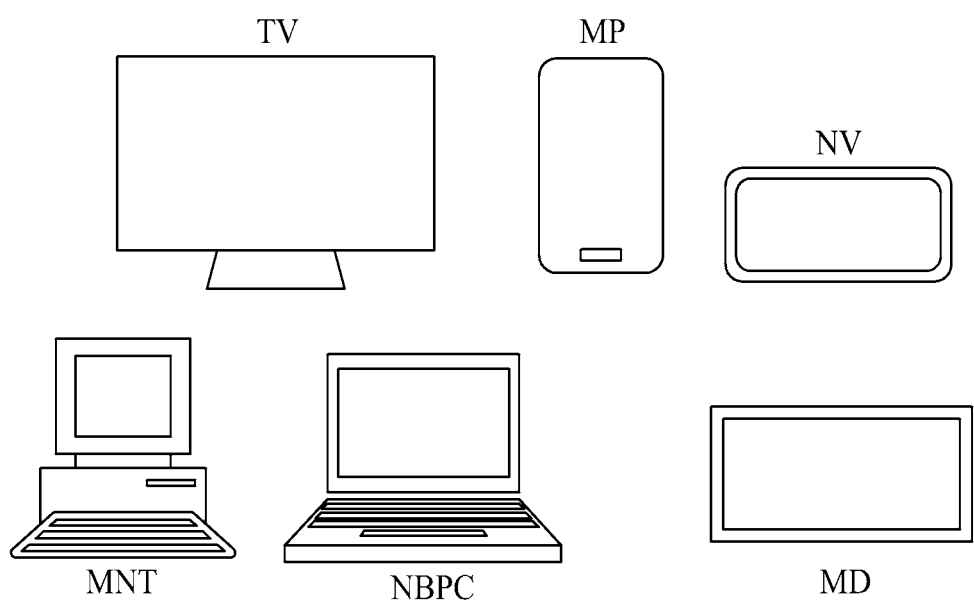
FIG. 10 is a diagram schematically illustrating examples of various application devices to which a touch display device according to embodiments of the present application is applied.

FIG. 10 is a diagram schematically illustrating examples of various application devices to which the touch display device TDD according to embodiments of the present application is applied.

Referring to FIG. 10, the touch display device TDD according to embodiments of the present application may be applied to various application devices. That is, the touch display device TDD according to embodiments of the present application may be implemented by applying the touch display device TDD to various application devices such as televisions (TVs), monitors MNT, notebook personal computers NBPC, mobile phones MP, navigation devices NV, vehicle displays MD, etc. Also, the touch display device TDD according to embodiments of the present application may be applied to mobile devices, video phones, smart watches, watch phones, wearable devices, foldable devices, rollable devices, bendable devices, flexible devices, curved devices, electronic organizers, portable multimedia player (PMPs), MP3 players, mobile medical devices, desktop personal computers, laptop personal computers, netbook computers, workstations, wall paper display devices, signage devices, game machines, refrigerators, cameras, camcorders, and home appliances, in addition to the various application devices illustrated in FIG. 10.

As described above, the embodiments of the present application provide a touch control circuit, a touch driving circuit, and a touch display device which can prevent system stability, display performance, and touch sensing performance from being reduced by EMI.

Moreover, the embodiments of the present application provide a touch control circuit, a touch driving circuit, and a touch display device, in which a setting is performed to appropriately and selectively change a characteristic of a touch driving signal according to an environment of an electronic device system.

Moreover, the embodiments of the present application provide a touch control circuit, a touch driving circuit, and a touch display device, in which a setting is performed to appropriately and selectively change a characteristic of a touch driving signal according to a touch sensing method of a touch driving circuit.

It will be apparent to those skilled in the art that various modifications and variations can be made in the present application without departing from the spirit or scope of the disclosures. Thus, it is intended that the present application covers the modifications and variations of this disclosure provided they come within the scope of the appended claims and their equivalents.

What is claimed is:

1. A touch display device comprising:
   a display panel including a plurality of data lines, a plurality of gate lines, a plurality of touch lines, and a plurality of touch electrodes;
   a data driving circuit configured to apply data voltages to the plurality of data lines;
   a gate driving circuit configured to apply a gate driving signal to the plurality of gate lines; and
   a touch driving circuit configured to apply a touch driving signal to the plurality of touch electrodes via the plurality of touch lines,
   wherein a pulse period of the touch driving signal comprises a first unit period where a voltage is configured to be varied from a first voltage level to a second voltage level, a second unit period where the voltage is configured to be maintained at the second voltage level, a third unit period where the voltage is configured to be varied from the second voltage level to the first voltage level, and a fourth unit period where the voltage is configured to be maintained at the first voltage level,
   wherein a waveform of the touch driving signal is configured to be selected based on a first setting value of the touch display device, and
   wherein a duration of time of the second unit period of the touch driving signal is configured to be varied based on a second setting value of the touch display device, the second setting value based on one or more of a driving time, a balance of battery, an internal or external temperature, an internal noise signal or external noise signal, or a touch sensing method of the touch display device.

2. The touch display device of claim 1, wherein
   the touch display device is configured to be divisionally driven in a display driving period and a touch driving period according to a touch control signal, and
   the touch control signal is configured to be set to have a voltage level which is shifted at least once during one frame period.

3. The touch display device of claim 1, wherein a voltage variation of the first unit period and a voltage variation of the third unit period of the touch driving signal are configured to have a symmetrical relationship with respect to the second unit period, and the touch driving signal is configured to a pulse signal which is repeated at the first to fourth unit periods.

4. The touch display device of claim 1, wherein the voltage of the first unit period and the voltage of the third unit period of the touch driving signal are configured to be varied identically or similarly to at least a portion of a graph of a function which includes an exponential function, a logarithmic function, a sine function, a cosine function, a step function, or a combination of two or more of the exponential function, the logarithmic function, the sine function, the cosine function and the step function.

5. The touch display device of claim 1, wherein the touch driving circuit comprises a first option pin for the first setting value and a second option pin for the second setting value.

6. The touch display device of claim 1, wherein the waveform of the touch driving signal is configured to be selected from a sine wave or a trapezoid wave based on a first setting value of the touch display device.

7. The touch display device of claim 6, wherein when the waveform of the touch driving signal is configured to be selected as the trapezoid wave based on the first setting value of the touch display device, the duration of time of the second unit period of the touch driving signal is configured to be selected from 0% to 100% of a sum of a duration of time of the first unit period and the duration of time of the second unit period based on the second setting value of the touch display device.

8. The touch display device of claim 1, wherein a start point of the first unit period of the touch driving signal is configured to be different from a start point of the second unit period of the touch driving signal and an end point of the first unit period of the touch driving signal is configured to be different from an end point of the second unit period of the touch driving signal.

9. The touch display device of claim 8, wherein the end point of the first unit period of the touch driving signal is configured to be equal to the start point of the second unit period of the touch driving signal.

10. The touch display device of claim 1, wherein the touch driving signal further includes a first touch driving signal and a second touch driving signal,
    wherein a second unit period of the first touch driving signal is configured to be selected by a first option of the second setting value and a second unit period of the second touch driving signal is configured to be selected by a second option of the second setting value, and
    wherein a duration of time of the second unit period of the first touch driving signal is configured to be different from a duration of time of the second unit period of the second touch driving signal.

11. The touch display device of claim 10, wherein a duration of time of the first unit period of the first touch driving signal is configured to be different from a duration of time of the first unit period of the second touch driving signal.

12. The touch display device of claim 1, wherein the first unit period of the touch driving signal is configured to be immediately followed by the second unit period of the touch driving signal, the second unit period of the touch driving signal is configured to be immediately followed by the third unit period of the touch driving signal and the third unit period of the touch driving signal is configured to be immediately followed by the fourth unit period of the touch driving signal.

13. The touch display device of claim 1, wherein the plurality of data lines, the plurality of gate lines or the plurality of touch electrodes are configured to be electrically floated without being supplied with a load free signal in a touch driving period,
wherein the load free signal is configured to have a same phase as a phase of the touch driving signal.

14. The touch display device of claim 1, wherein the touch driving circuit includes a plurality of touch driving/sensing multiplexers, a plurality of touch driving/sensing units, a plurality of ADC multiplexers and an analog digital converter,
wherein the plurality of touch driving/sensing multiplexers are configured to be electrically connected to the plurality of touch lines.

15. The touch display device of claim 14, wherein a number of the plurality of touch driving/sensing multiplexers is configured to be equal to a number of the plurality of touch driving/sensing units.

16. The touch display device of claim 14, wherein a number of channels of ADC multiplexers is configured to be equal to a number of the plurality of touch driving/sensing units.

17. The touch display device of claim 1, wherein the duration of time of the second unit period is configured to be a time between the first unit period and the third unit period.

18. The touch display device of claim 1, wherein the voltage is configured to constantly rise over an entire duration of the first unit period from the first voltage level to the second voltage level that is greater than the first voltage level.

* * * * *